United States Patent [19]

Numata et al.

[11] Patent Number: 5,076,408
[45] Date of Patent: Dec. 31, 1991

[54] ONE-WAY CLUTCH HAVING IMPROVED ANNULAR RETAINER PLATES

[75] Inventors: Tetsuaki Numata, Osaka; Tomoyuki Yogata, Anjo, both of Japan

[73] Assignees: Koyo Seiko Co., Ltd., Osaka; Aisin AW Co., Ltd., Anjo, both of Japan

[21] Appl. No.: 671,923

[22] Filed: Mar. 20, 1991

[30] Foreign Application Priority Data

May 1, 1990 [JP] Japan .................. 2-47195[U]

[51] Int. Cl.$^5$ ............................................ F16D 41/06
[52] U.S. Cl. .................. 192/41 A; 192/45.1; 192/113 B
[58] Field of Search .............. 192/41 R, 41 A, 45.1, 192/113 R, 113 B; 188/82.8

[56] References Cited

U.S. PATENT DOCUMENTS

| | | | |
|---|---|---|---|
| 2,834,445 | 5/1958 | Gorsky | 192/45.1 |
| 3,175,661 | 3/1965 | Mauer et al. | 192/45.1 |
| 4,347,763 | 9/1982 | Sakakibara et al. | 188/82.8 X |
| 4,736,827 | 4/1988 | Kinoshita | 192/41 A |
| 4,913,271 | 4/1990 | Kinoshita et al. | 192/41 R |
| 4,961,486 | 10/1990 | Kinoshita et al. | 192/41 R |

FOREIGN PATENT DOCUMENTS 64-49738 3/1989 Japan .
1-108423 4/1989 Japan .................. 192/45.1

Primary Examiner—Richard Lorence
Attorney, Agent, or Firm—Wenderoth, Lind & Ponack

[57] ABSTRACT

In a one-way clutch, a plurality of sprags held by a retainer in a swingable manner and forced by a spring in one direction are interposed between an inner ring and an outer ring. A pair of end bearings are slidably fit to the outer ring on both sides of the retainer between the inner and outer rings. A pair of annular retainer plates each having a plurality of pawls around an outer periphery are provided so that the annular retainer plates support the end bearings in opposite axial directions when fastened to the outer ring by the pawls. An annular recessed portion is concentrically formed on an annular part of each annular retainer plate. When the retainer plates are mounted in position, the annular recessed portion of one of the retainer plates is opposite both a radially inside part of one end face of the outer ring and a radially outside part of a corresponding end face of one of the end bearings, and the annular recessed portion of the other retainer plate is opposite both a radially inside part of the other end face of the outer ring and a radially outside part of a corresponding end face of the other end bearing.

2 Claims, 3 Drawing Sheets

ONE-WAY CLUTCH HAVING IMPROVED ANNULAR RETAINER PLATES

BACKGROUND OF THE INVENTION

This invention relates to a one-way clutch to allow the transmission of a rotating torque between inner and outer rings only in one direction.

A typical prior art one-way clutch is disclosed in the Japanese Utility Model Laid-open Publication No. 64-49738 and shown in FIG. 5. This one-way clutch has an inner ring 21, an outer ring 22, a plurality of sprags 23 interposed between the inner ring 21 and the outer ring 22, retainers 24 for holding the sprags 23 in a manner allowing the sprags 23 to swing, a spring 25 for forcing the sprags 23 in one direction, end bearings 26 which are slidably fit to the outer ring 22 and support the retainers 24 to positionally fix them in an axial direction, and annular retainer plates 27 which support the end bearings 26 in the axial direction from outside with pawls 27a holding clamped portions 22a of the outer ring 22.

FIG. 6 shows a front view of the retainer plate 27 and FIG. 7 shows a side view of the retainer plate 27 taken in the direction of arrow VII of FIG. 6.

As shown in FIGS. 6 and 7, the retainer plates 27 are each formed from an annular thin plate such that one side of the plate has four recesses 27b radially extending with both ends opened at even intervals in an circumferential direction of the plate and the other side of the plate has also four recesses 27c radially extending with both ends opened at even intervals in the circumferential direction. Naturally, the phase of the recesses on each side is offset from the phase of the recesses on the other side, and each recess functions as a passage for lubrication. The retainer plates 27 are adapted to slide in contact with plastic washers 28 fixed to rotating members 29 such as gears.

However, in the prior art one-way clutch described above, a problem with warping of the retainer plates 27 caused by quenching, tempering and other heat processes during production occurs because the retainer plates 27 are formed from a thin plate such that the thin plate has alternate recesses as described above and that the configuration of the axial cross section of the retainer plates varies at different points in the circumferential direction. In addition, the retainer plates 27 do not have sufficient rigidity. Therefore, for example, the retainer plates 27 are easily bent, and the axial length of the pressure plates as indicated by T in FIG. 5 is easily reduced by elastic deformation when a sandwiching force is axially applied to the pressure plates from both sides.

FIG. 8 is a partial plan view schematically illustrating a contact state of the plastic washer 28 and the retainer plate 27. As shown in FIG. 8, each plastic washer has lubricant holding channels 28b formed at plural locations spaced apart in a circumferential direction on a face 28a opposing the retainer plate 27. Consequently, protruding portions 27d which are back side of the recesses 27b on the retainer plates 27 intermittently contact an angled portion A of each lubricant holding channel 28b during rotation of the plastic washers 28, thus causing the angled portions A to wear. The resulting abrasion debris can then cause the lubricant to deteriorate. Note that in FIG. 8, arrow R indicates a direction in which the plastic washers 28 rotate.

SUMMARY OF THE INVENTION

An object of the present invention is therefore to provide a one-way clutch wherein warping of the retainer plates caused by heat processing can be reduced and high rigidity is provided to the retainer plates, and wherein the retainer plates can hold lubricating oil to well lubricate fitting portions between the end bearings and outer ring and contact portions between the end bearings and the retainer plates.

Another object of the present invention is to provide a one-way clutch which can prevent the plastic washers from wearing.

The present invention provides an improvement upon a one-way clutch of a type which comprises an inner ring and an outer ring, a plurality of sprags interposed between the inner ring and the outer ring, a retainer for holding the sprags so that the sprags can sway, a spring for forcing the sprags in one direction, a pair of end bearings which are fit between the inner and outer rings on both sides of the retainer so that the end bearings can rotate in sliding contact with the outer ring and that the end bearings support the retainer in opposite axial directions of the one-way clutch, and a pair of annular retainer plates each having an annular portion and a plurality of clamping portions for fastening the annular retainer plates to the outer ring and provided in a manner that the annular retainer plates sandwich the end bearings therebetween, said annular retainer plates supporting the end bearings in the opposite axial directions respectively when fastened to the outer ring by the clamping portions.

In the improvement, each of the retainer plates has an annular recessed portion concentrically provided on the annular portion. When the retainer plates are mounted in position, the annular recessed portion of one of the retainer plates is positioned opposite both a radially inside part of one end face of the outer ring and a radially outside part of a corresponding end face of one of the end bearings, and the annular recessed portion of the other retainer plate is positioned opposite both a radially inside part of the other end face of the outer ring and a radially outside part of a corresponding end face of the other end bearing.

The one-way clutch with the above structure operate as follows.

Because the retainer plates each have a configuration as described above, the cross section in a radial direction of the annular portion, except for the clamping portions thereof, of each retainer plate is constant around the complete circumference. Due to this constant shape of the axial cross section of the annular portion, except for the clamping portions thereof, of each retainer plate, the retainer plate does not warp very much due to hardening, tempering, or other heat processes as does the conventional retainer plate. As a result, production of the retainer plate can thus be simplified.

In addition, because the retainer plate has the annular recessed portion as thus described, the stiffness of the retainer plate becomes larger than that of the conventional retainer plate, if the retainer plate is formed from a thin plate of the same thickness as that of the conventional retainer plate, and if the annular portion has the same inside and outside diameters as those of the conventional retainer plate, and if the axial cross section of each part of the annular portion has the same area as that of the conventional retainer plate. That is, the modulus of section relative to a radial direction of the axial cross section of the retainer plate of the present invention is greater than that of a rectangular cross section of the conventional retainer plate. In other words, the rigidity to bending of the retainer plate having the annular recessed portion according to the present invention is greater than that of the conventionally shaped component. As a result, the sprags can be reliably held to a predetermined position in the axial direction through the end bearings and the retainer. The rigidity in the axial direction is also increased.

When each retainer plate is fastened in position with the clamping portions thereof holding the outer ring and supports the end bearing in the axial direction from the outside, the annular recessed portion of the retainer plate is positioned opposite both the radially outside part of the end bearing and the radially inside part of the outer ring. Therefore, a gap formed between fitting portions of the end bearing and outer ring is open to an annular space enclosed by the annular recessed portion, the radially outside part of the end bearing and the radially inside part of the outer ring. The annular recessed portion of the retainer plate forms a lubricant reservoir or groove. Lubricant flowing through the aforementioned gap after it lubricates the fitting portions of the outer ring and end bearing enters and is stored in the lubricant groove of the annular recessed portion. The lubricant stored in this recessed portion is supplied to the fitting portions of the end bearing and the outer ring, and contact portions of the retainer plate and the end bearing as well, to lubricate those portions. As a result, the end bearing and outer ring, and the retainer plate and end bearing will not heat up and seize due to insufficient lubrication or become deformed due to heating from friction.

In addition, no parts of the retainer plate strikes the stepped portion of each lubrication holding channel of the plastic washer unlike the prior art, and therefore the stepped portions of the plastic washer do not wear. Thereby deterioration of the lubricant can be prevented.

Preferably, the recessed portion has a generally trapezoidal shape without angular corners in a cross section. In this case, stress concentration due to presence of angular corners can be avoided.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
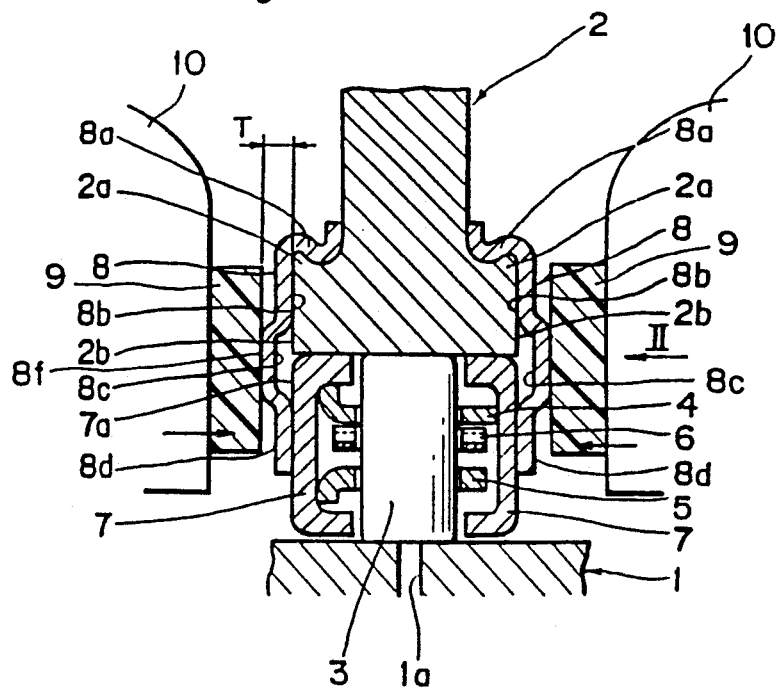
FIG. 1 is an axial cross sectional view of the essential elements of a one-way clutch according to a preferred embodiment of the present invention.

As shown in FIG. 1, a one-way clutch according to an embodiment of the present invention has an inner ring 1, an outer ring 2, a plurality of sprags 3 provided between the inner ring 1 and the outer ring 2, annular retainers 4 and 5 which are also interposed between the inner ring 1 and the outer ring 2 for holding the sprags 3 at predetermined intervals in a circumferential direction in a manner allowing the sprags 3 to sway, a spring 6 provided between the retainers 4 and 5 and forcing the sprags 3 in one direction causing the sprags 3 to engage between the inner ring 1 and the outer ring 2. The one-way clutch also has a pair of end bearings 7 and a pair of generally annular retainer plates 8 for axially supporting the end bearings 7 from the outside in a manner sandwiching the end bearings 7 therebetween.

The end bearings 7 each have a generally U-shaped cross section and are provided on both sides of the retainers 4 and 5 so as to sandwich the retainers 4 and 5 therebetween. The end bearings 7 are slidably fit to the inner ring 1 and the outer ring 2. The end bearings 7 support the retainers 4 and 5 in opposite axial directions, and hold the inner ring 1 and the outer ring 2 in approximately coaxial positions.

The annular retainer plates 8 are mounted to the outer ring 2 and support the end bearings 7 from the outside in the opposite axial directions as indicated by arrows in FIG. 1.

Figure 3:
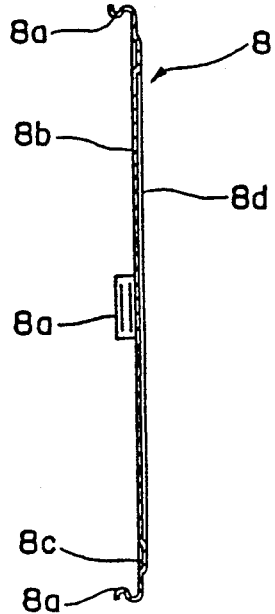
FIG. 3 is a cross sectional view taken on the line III—III of FIG. 2.
Figure 2:
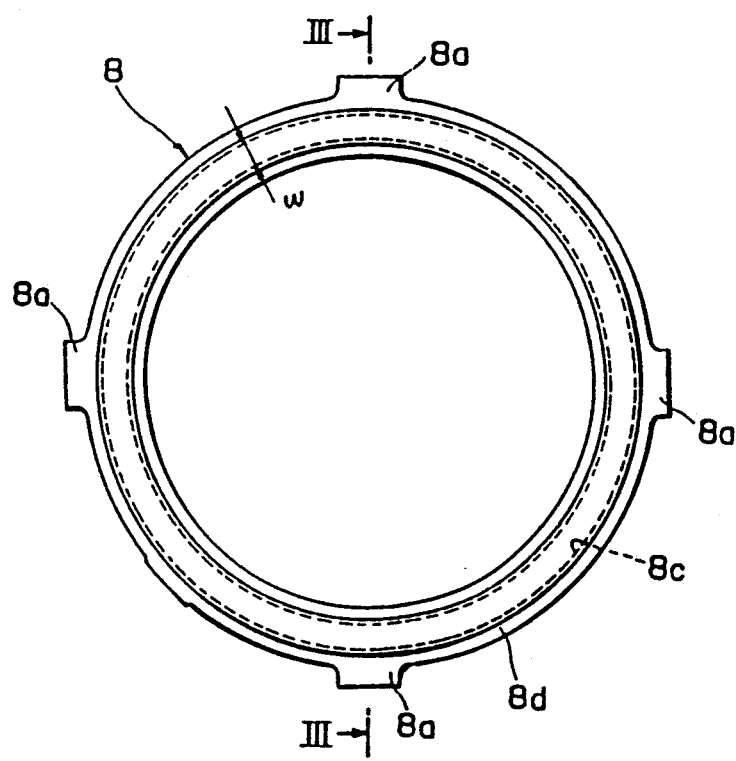
FIG. 2 is a front view taken in the direction of arrow II of a retainer plate in FIG. 1.
Figure 5:
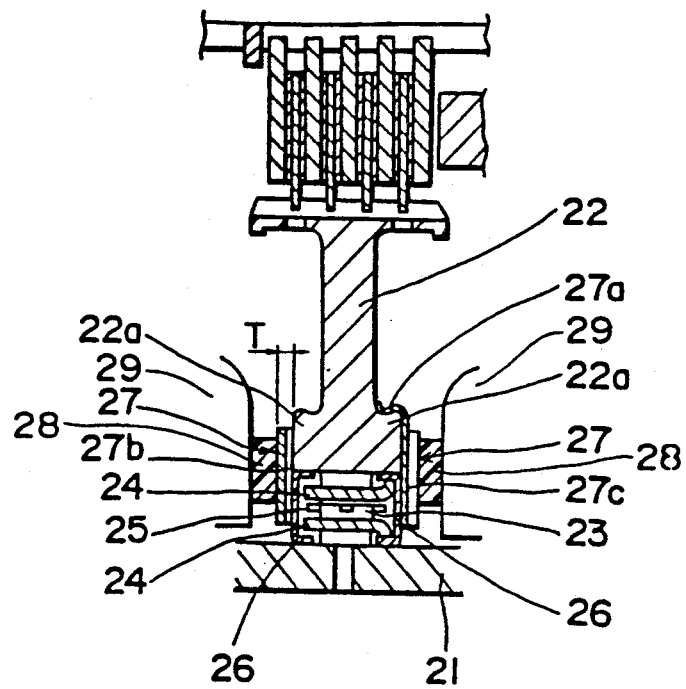
FIG. 5 is an axial cross sectional view of the essential elements of the conventional one-way clutch.

Both of the two retainer plates 8 are identical, each provided at the outside circumference thereof with plural pawls 8a having an S-shaped curve as shown in FIGS. 1 through 3. As shown in FIG. 1, the retainer plates 8 are secured to the outer ring 2 by means of these pawls 8a elastically clamping held portions 2a of the outer ring 2. Also as shown in FIG. 1, the retainer plates 8 each have an annular recessed portion 8c, which has a generally trapezoidal shape without angular corners in a cross section, on an inside face 8b facing both the outer ring 2 and the end bearings 7. The annular recessed portion 8c of each retainer plate 8 is positioned opposite both a radially inside portion (hereafter referred to simply as inside portion) 2b of an end face of the outer ring 2 and a radially outside portion (hereafter referred to simply as outside portion) 7a of an end face of the end bearing 7. In other words, the annular recessed portion 8c is provided on each retainer plate 8 so that the annular recessed portion 8c is opposite the inside portion 2b of the outer ring 2 and the outside portions 7a of the end bearings 7 when the retainer plates 8 are mounted in position by holding the clamped portions 2a of the outer ring 2 by means of the pawls 8a.

As shown in FIG. 2, the annular recessed portion 8c is provided concentrically to each retainer plate 8 with a predetermined width W in a radial direction of the retainer plate. The retainer plates 8 are formed from an annular thin plate (not shown in the figure) having radially protruding portions which correspond to the pawls 8a. The pawls 8a are formed by shaping the protruding portions of the annular thin plate to an S-shaped profile, and the annular recessed portion 8c is formed at an annular part of the thin plate by a press-molding method to have a cross section as shown in FIG. 1. Thus, a side 8d, which is the side of the retainer plate 8 opposite that into which the recessed portion 8c is formed, axially protrudes to the outside by an amount equal only to the depth of the recessed portion 8c.

Plastic washers 9 fixed to rotating members 10 such as, for example, gears slide in contact with the retainer plates 8.

As described above, the annular retainer plates 8 each have the annular recessed portion 8c opposite both the inside portion 2b of the outer ring 2 and the outside portion 7a of the end bearing 7, and therefore have an axial cross section of the annular part which is constant at all points around the circumference except at the pawls 8a. Thus, the retainer plate 8 will not warp greatly after quenching, tempering, and other heat treatment processes as does the conventional retainer plate. In other words, the warping which occurs during heat treatment of the above retainer plate 8 of this embodiment is less than that which occurs with the conventional retainer plate.

Furthermore, because the retainer plate 8 is provided with the annular recessed portion 8c, if the retainer plate 8 is formed under the same condition as the conventional retainer plate with respect to the thickness of a thin plate, inside and outside diameters of the annular part of the thin plate and the area of an axial cross section of the retainer plate, the section modulus relative to the radial direction of the axial cross section (see FIG. 1) of the retainer plate 8 is greater than a simple rectangular section of the conventional retainer plate 27. In other words, the rigidity to bending of the retainer plate 8 having the annular recessed portion 8c according to the present invention is greater than that of a conventionally shaped retainer plate. In addition, because a bottom wall of the recessed portion 8c extend around the complete circumference, the rigidity against pressure in the axial direction is also higher than that of the conventional retainer plate wherein the recessed portions are intermittently provided around the circumference and bottom walls thereof which oppose a force applied in the axial direction are therefore intermittent.

For example, according to necessity, there is provided a thrust bearing not shown in the figure which bears the axially outside surface of each retainer plate 8. The outer ring 2 and the retainer plates 8 are thus positioned in the axial direction relative to the inner ring 1 by means of each thrust bearing.

The sprags 3 are supported in the axial direction by the retainer plates 8 through the end bearings 7 and the retainers 4 and 5, and thus positionally fixed in the axial direction between the inner ring 1 and the outer ring 2. Because the retainer plates 8 have high rigidity as described above, and therefore are not easily elastically deformed, the thickness in the axial direction indicated by T in FIG. 1 is not made smaller unlike the conventional retainer plate. As a result, the sprags 3 are reliably held at the predetermined positions in the axial direction between the inner ring 1 and the outer ring 2.

Only when the inner ring 1 rotates relative to the outer ring 2 in a given one direction, the sprags 3 are raised between the inner ring 1 and the outer ring 2, being engaged with the inner ring 1 and the outer ring 2 by a wedge action and thereby transferring a rotating torque from the inner ring 1 to the outer ring 2. At this time, the outer ring 2, sprags 3, retainers 4 and 5, spring 6, end bearings 7, and retainer plates 8 turn together with the inner ring 1. On the other hand, when the inner ring 1 turns relative to the outer ring 2 in a direction opposite that described above, the sprags 3 are not engaged with the inner ring 1 and the outer ring 2. Therefore, the inner ring 1 turns idly with respect to the outer ring 2. At this time, the sprags 3, retainers 4 and 5, spring 6, and end bearings 7 turn with the inner ring 1. The end bearings 7 turn relative to the outer ring 2 and the retainer plates 8.

A lubricant (not shown in the figures) is supplied by, for example, centrifugal force from a lubrication hole 1a (see FIG. 1) provided in the inner ring 1 to a space defined by the inner ring 1, the outer ring 2 and the end bearing 7 to lubricate the contact parts of the end bearings 7 and the inner ring 1 and outer ring 2, the contact parts of the sprags 3 and the retainers 4 and 5, and the contact parts of the sprags 3 and the spring 6. Part of the supplied lubricant lubricates the fitting of the outer ring 2 and the end bearings 7 and flows out through the gaps between the outer ring and the end bearings toward the retainer plates 8. However, the retainer plates 8 each have the recessed portion 8c opposite both the inside portion 2b of the outer ring 2 and the outside portion 7a of the end bearings 7 as described above. The gap formed at the fitting of each end bearing 7 and the outer ring 2 is open to an annular space enclosed by the inside surface of the recessed portion 8c, the inside portion 2b of the outer ring 2, and the outside portion 7a of the end bearing 7. Therefore, the lubricant outflowing from the gaps is stored in the annular recessed portions 8c of the retainer plates 8. In other words, the recessed portions 8c function as lubricant grooves.

As described above, the recessed portion 8c on each retainer plate 8 increases the rigidity of the retainer plate 8 and at the same time functions as a lubricant groove. The lubricant stored in the recessed portions 8c is supplied to the fitting of the end bearings 7 and the outer ring 2, and to the contact portions of the retainer plates 8 and the end bearings 7 where the end bearings 7 are supported by the retainer plates 8, and lubricates those parts. Therefore, the end bearings 7 and outer ring 2, and the retainer plates 8 and end bearings 7 will not seize or become deformed due to heating from insufficient lubrication.

Figure 4:
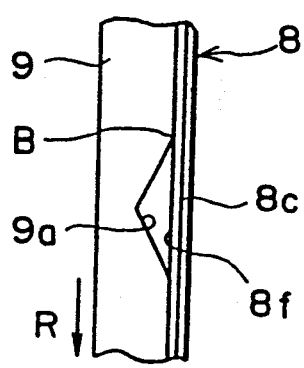
FIG. 4 is a partial plan view schematically illustrating the contact state of the plastic washer and the retainer plate.
Figure 8:
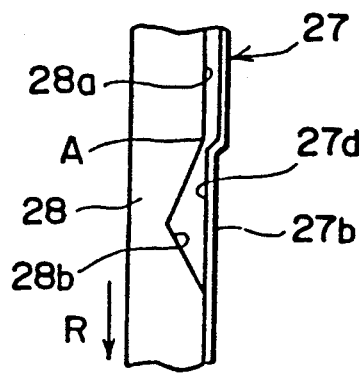
FIG. 8 is a partial plan view schematically illustrating the contact state of the plastic washer and the retainer plate in the conventional one-way clutch.
Figure 7:
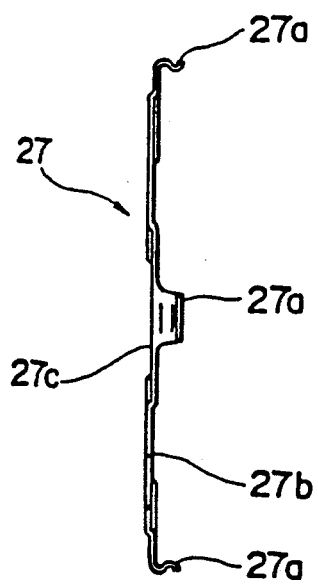
FIG. 7 is a side view of the retainer plate taken in the direction of arrow VII of FIG. 6.
Figure 6:
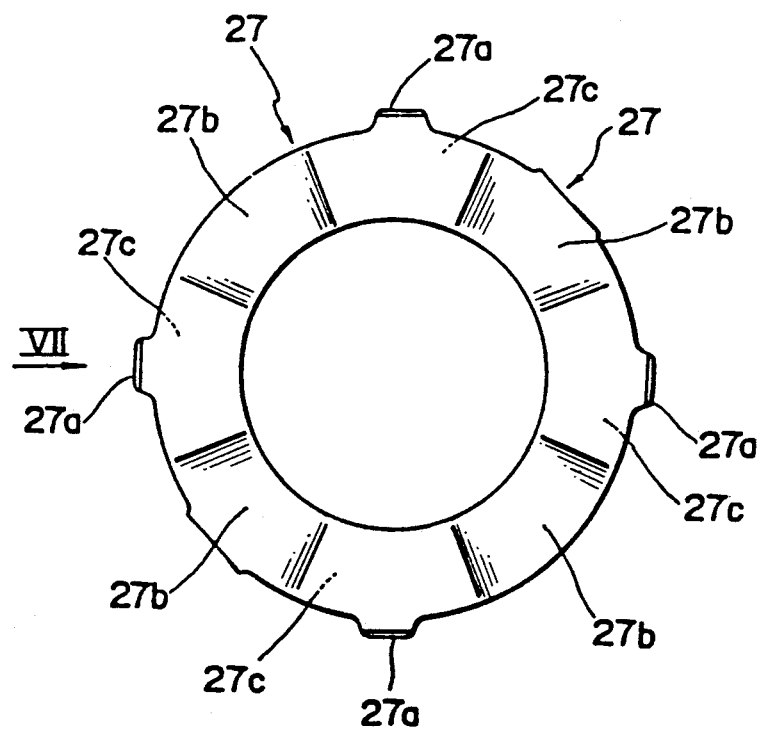
FIG. 6 is a front view of the retainer plate in FIG. 5.

In addition, as shown in FIG. 4, the plastic washers 9 each are provided with a lubricant holding channel 9a at plural locations on an end face thereof confronting a face 8f (also see FIG. 1) of a raised portion of the retainer plates 8. Because the annular recessed portion 8c of the retainer plate 8 is provided concentrically thereto with a predetermined width W in the radial direction, when the plastic washers 9 rotate, the raised portion 8f formed by the recessed portion 8c of each retainer plate 8 does not strike an angled portion B of the lubricant holding channel 9a, and the angled portion B therefore does not wear. Note that R indicates a direction in which the plastic washers 9 rotate.

It is to be noted that the configuration of the clamped portions to be provided on the outer ring and of the clamping portions on the retainer plate for holding the clamped portions shall not be limited to that of the clamped portions 2a and the pawls 8a, respectively, of the embodiment described hereinabove. Furthermore, the configuration of the annular recessed portion to be provided on the retainer plate shall likewise not be restricted to that described hereinabove. Furthermore, material of the retainer plate shall not be restricted to a thin plate as described hereinabove.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch which comprises an inner ring and an outer ring, a plurality of sprags interposed between the inner ring and the outer ring, at least one retainer for holding the sprags so that the sprags can sway, a spring for forcing the sprags in one direction, a pair of end bearings which are fit between the inner and outer rings on both sides of the retainer so that the end bearings can rotate in sliding contact with the outer ring and that the end bearings support the retainer in opposite axial directions of the one-way clutch, and a pair of annular retainer plates each having an annular portion and a plurality of clamping portions for fastening the annular retainer plates to the outer ring and provided in a manner that the annular retainer plates sandwich the end bearings therebetween, said annular retainer plates supporting the end bearings in the opposite axial directions respectively when fastened to the outer ring by the clamping portions, characterized in that:

each of the retainer plates has an annular recessed portion concentrically provided on the annular portion, the annular recessed portion of one of the retainer plates being positioned opposite both a radially inside part of one end face of the outer ring and a radially outside part of a corresponding end face of one of the end bearings, and the annular recessed portion of the other retainer plate being positioned opposite both a radially inside part of the other end face of the outer ring and a radially outside part of a corresponding end face of the other end bearing.

2. The one-way clutch as claimed in claim 1, wherein the recessed portion has a generally trapezoidal shape without angular corners in a radially sectional view.

* * * * *